United States Patent Office 2,755,195
Patented July 17, 1956

2,755,195
PROCESS FOR PREPARING PIGMENT PREPARATIONS

Werner Grubenmann, Neuewelt, near Basel, Switzerland, assignor to Ciba Limited, Basel, Switzerland, a Swiss firm No Drawing. Application July 2, 1953, Serial No. 365,763

Claims priority, application Switzerland July 4, 1952

5 Claims. (Cl. 106—309)

The need often arises in practice for pigments which are in a finely dispersed form, and which can be incorporated directly into organic materials such as lacquers, oily coating compositions, artificial substances of all kinds and especially spinning solutions in an extremely fine state of dispersion in the material to be pigmented. It is known that in certain cases pigments can be finely dispersed in very viscous organic media, for example, in solutions of acetyl-cellulose in acetone, by intense mechanical treatment, for example, by kneading and/or by treatment in a rolling mill. However, the applicability of this process is limited owing to the fact that an extremely viscous medium and very intense mechanical treatment are necessary.

The present invention provides a process which is capable of general application and enables pigment preparations to be made which fulfil practically all requirements. In accordance with this invention pigment preparations are made by subjecting a pigment to a mechanical treatment in an organic medium having a viscosity of at least 10 centipoises at 20° C. and in the presence of a grinding body capable of being washed out subsequently, and, if desired, subsequently removing the grinding body.

The pigments used in the present process, especially if they do not consist of grains which are too hard, may be of an inorganic character such as carbon black and the like, but they may also be of organic character and may belong for example, to the series of azodyestuffs, vat dyestuffs, phthalocyanines or the like.

The organic medium having a viscosity of at least 10 centipoises at 20° C., which is used in the present process, may be a unitary oil or a softening agent such as an animal or vegetable oil, a mineral oil, or dibutyl phthalate, or another compound, such as is known in the lacquer industry as a plasticizer, the said plasticizers generally possessing a very high boiling point. However, the said organic medium may be a solution of a solid or plastic substance, especially a substance of film-forming character, in a comparatively low boiling organic solvent such as toluene, for example, a solution of a purified natural resin, artificial resin, and especially a resin of non-hardening character, rubber, a rubber derivative and a soluble organic derivative of cellulose. Finally there may also be used in certain cases in the form of a melt, fusible compounds of the aforesaid kind which are solid at ordinary temperature, for example, a melt of colophony.

The grinding body, also known as a grinding assistant, used in the present process must be capable of being washed out of the organic media referred to above. In the simplest case there may be used as grinding bodies the ordinary inorganic salts such as sodium chloride, potassium chloride, sodium sulphate, barium chloride and the like, which can be washed out in a simple manner with water. An obvious requirement for the grinding body is that it should not dissolve or not dissolve to any material extent under the conditions of treatment in the organic medium which is used, because otherwise it could not act as a grinding body. Furthermore, there are used grinding bodies which do not react chemically with the other ingredients of the mixture to be ground. These conditions are substantially wholly fulfilled in the case of simple, inexpensive inorganic salts. Although it is possible to use in the present process grinding bodies which cannot be washed out with water, but can be washed out with acid or alkaline solutions, there is usually no advantage in using them.

Although there is usually no advantage in using organic compounds as grinding bodies, having regard to the satisfactory action and low price of the aforesaid inorganic salts, there are special cases in which organic grinding bodies may be used. Thus, for example, urea is practically insoluble in acetone and also in acetone solutions of acetyl-cellulose, so that urea may be used in this connection. In this case the urea can be washed out by means of ethyl alcohol, which does not dissolve the acetyl-cellulose.

The mechanical treatment of the present process may be carried out in apparatus of known construction, for example, in stirring or mixing appliances which are designed for operation with relatively viscous media, and also rolling mills and especially kneading appliances working on the Werner-Pfleiderer system. Depending on the medium used, the treatment is carried out at room temperature or if required at a higher or lower temperature. In the case of melts which are solid at room temperature it is of advantage to work at the temperature at which the melt has a favourable viscosity.

Of special technical importance is the possibility of using any kind of mixing, stirring or kneading mechanism having a relatively small consumption of energy, since the viscosity of the organic medium may vary within wide limits and at relatively low viscosities the desired state of fineness of the pigment can be obtained by correspondingly prolonging the period of the kneading treatment.

On the other hand it will be understood that by correspondingly modifying the mixture to be kneaded, it is possible to work with a kneading mechanism of very heavy construction (for example, the dispersion kneader of the firm Werner and Pfleiderer), whereby with an organic medium of correspondingly higher viscosity the kneading period required in order to produce the desired state of fineness of the pigment can be considerably shortened.

The result of the aforesaid mechanical treatment is a fine dispersion of the pigment in the organic medium, which dispersion still contains the grinding body. The grinding body is removed from the dispersion in accordance with the invention by washing it out with a suitable solvent. This washing out of the grinding body from the still liquid organic medium is carried out with the aid of a solvent which is immiscible with the organic medium. In the simplest case this solvent may be water. When a melt is used it is of advantage to disintegrate it mechanically, after cooling it, and then to wash out the grinding body. When a sufficiently strong kneader is used the grinding body can be removed directly by kneading the melt with a solvent, for example, water. It is also possible in the case of an organic medium which consists of a solid or semi-solid substance and a solvent, first to remove the solvent and then to remove the grinding body by washing from the solid or semi-solid, and advantageously mechanically disintegrated, product. Finally, it is also possible, that the addition of water or a solvent foreign to the system leads to the precipitation of the solid constituents of the organic medium, whereafter one can wash out the grinding body in a similar manner. Thus, for example, a solution of acetyl cellulose in acetone may be precipitated with water or ethyl alcohol and then the grinding body may be washed out of the product, advantageously after it has been mechanically disintegrated.

When the organic medium contains a solvent the latter may be removed by evaporation, if desired, after removing the grinding body.

When the organic medium contains a solvent which is miscible with the solvent to be used for washing out the grinding body, and when the non-volatile portion of the organic medium is capable of being kneaded at a raised temperature, the solvent and the grinding body can be washed out together at a raised temperature, whereby a melt is produced consisting of the pigment and a substance which is plastic at a raised temperature. Any solvent which is used for washing out and is still present in the melt can be removed, for example, by direct evaporation in the kneading apparatus.

After washing out the grinding body there is obtained in accordance with the invention a fine suspension of a pigment in a liquid, semi-solid or solid organic medium, the choice of the organic medium being extremely wide so that it can be selected according to the use for which the pigment preparation is intended. Thus, if the pigment preparation is to be used for coloring acetyl-cellulose, lacquers or the like, the composition of the pigment preparation can be so chosen that its organic medium is compatible with the lacquer in question. The process of this invention is especially advantageous for the manufacture of pigment preparations which are to be used for color spinning a very wide variety of artificial fibers, for example, for color spinning cellulose acetate artificial silk, or fibers of superpolyamides or superpolyurethanes, and also fibers of polyacrylic derivatives, especially polyacrylonitrile, superpolyesters of the type of terephthalic acid glycol ester and also artificial fibers of polyvinyl compounds, if desired, in the form of copolymers with polyacrylic derivatives.

In general the process of this invention leads in a relatively short time to a very fine dispersion of the pigment, in some cases up to the limit of optical resolution even in cases where insufficient dispersion is obtained by other processes. Thus, for example, by the present process it is possible to grind directly phthalocyanines, for example, copper phthalocyanine, in the coarse form in which it is obtained in its manufacture, without any preliminary reprecipitation from sulphuric acid. This has the advantage that the conversion, for example, of copper phthalocyanine into the so-called α-form is avoided so that the copper phthalocyanine originally present in the β-form is converted without alteration of its crystal structure directly into a very valuable technical product.

The relative proportions of the pigment and the non-volatile constituents of the organic medium are not critical and may vary within relatively wide limits. It is however of advantage for maintaining the degree of dispersion to use not too small a quantity of artificial substance, plasticizer or the like, and advantageously such a proportion thereof that the quantity of pigment in the final product is generally not substantially more than half.

The relative proportions of the pigment and grinding body may also vary within wide limits. A relatively small proportion of the grinding body, for example, about one-fifth of the quantity of pigment, entails a rather long treatment period. There is used with advantage a quantity of the grinding body which is at least equal to that of the pigment, but in general the proportion of the grinding body should not exceed 5 times that of the pigment, as otherwise there is too great a loss of volume when the grinding body is washed out, and furthermore the viscosity of the mass to be worked up is unfavorably influenced.

When the organic medium consists of an artificial resin, a cellulose derivative or the like and an organic solvent, the proportion of the solvent is advantageously so chosen that during the kneading operation a good kneading mass is formed with which the desired degree of fineness of the pigment is quickly attained.

The following examples illustrate the invention, the parts being by weight unless otherwise stated, and the relationship of parts by weight to parts by volume being the same as that of the kilogram to the liter:

*Example 1*

60 parts of copper phthalocyanine (reprecipitated from sulfuric acid in the usual manner), 120 parts of "Staybelite Ester No. 10" (glycerine ester of hydrogenated colophony), 120 parts of sodium chloride and 30 parts of toluene are introduced into a kneading apparatus working on the Werner-Pfleiderer system and capable of being cooled. The mixture is kneaded in the closed kneading apparatus and while cooling until the desired degree of fineness of the pigment of 1 micron and below is attained. The sodium chloride is then washed out of the kneaded mass by introducing water. The kneaded mass itself remains in the apparatus, and the washing water advantageously flows over the edge of the kneading apparatus into and through a channel arranged around the kneading apparatus or flows out through an outflow opening disposed at a suitable height. The kneaded product freed from salt is dried in a vacuum drying cabinet at 85° C. and is finally ground in a ball mill. Alternatively, the kneading mass could of course be dried in the kneading apparatus itself, if this is technically advantageous.

By using, instead of the above mentioned pigment, crude β-copper phthalocyanine (obtained, for example, by the reaction of phthalic anhydride with urea in trichlorobenzene by the usual process) there is obtained a preparation of which the pigment consists of pure β-copper phthalocyanine.

A product having analogous properties is obtained by using in this example, instead of the aforesaid pigments, the dyestuff obtained by chlorinating copper phthalocyanine (Schultz, Farbstofftabellen, 7th Edn., supplementary volume II, page 195) and otherwise working in the same manner.

*Example 2*

A mixture of 60 parts of the dyestuff obtained from diazotized 2-methyl-4-chloro-1-aminobenzene and 1-(2'-hydroxy-3'-naphthoyl)-amino-2-methyl-4-chlorobenzene, 120 parts of "Staybelite Ester No. 10," 120 parts of sodium chloride and 40 parts of toluene is treated, while cooling, in the kneading apparatus described in Example 1 until the desired degree of fineness of the pigment is attained. The sodium chloride is then washed out by introducing water into the kneaded mass as described in Example 1, and the mass is dried in a vacuum cabinet at 85° C., and finally ground in a ball mill.

By using, instead of 120 parts of sodium chloride, 120 parts of anhydrous sodium sulfate or 120 parts of cane sugar and otherwise working in the manner described above, identical products are obtained.

*Example 3*

300 parts of 4:4'-dimethyl-6:6'-dichlorothioindigo in the form of an aqueous press cake having a pigment content of 20 per cent. and 60 parts of dibutyl phthalate are introduced into a kneading apparatus of the Werner-Pfleiderer type capable of being heated. The mixture is heated up with steam and after a short time a kneading mass is formed. The water which separates free from pigment is removed, and the mixture is kneaded while heating until the water still present in the mass is evaporated. There are then added 90 parts of sodium chloride, and kneading is carried on, while cooling, until the desired degree of fineness of the pigment is attained. After washing out the sodium chloride by introducing water, the resulting paste is freed from residual water in a vacuum cabinet at 85° C.

Instead of a press cake, there may equally well be used as starting material a dyestuff powder. For example, 60 parts of the dyestuff from diazotized 2-methyl-4-chloro-1-aminobenzene and 1-(2'-hydroxy-3'-naphthoyl)-amino-2-methyl-4-chlorobenzene, 60 parts of dibutyl phthalate and 90 parts of sodium chloride are kneaded in the manner described above, whereby an analogous product is obtained.

A pigment preparation can be prepared in a similar manner by starting from 60 parts of the calcium salt of the azo-dyestuff from diazotized 1-amino-4-methylbenzene-2-sulfonic acid and 2-hydroxynaphthalene-3-carboxylic acid.

Example 4

80 parts of indigo, 80 parts of "Staybelite Ester No. 10," 100 parts of anhydrous sodium carbonate and 60 parts of toluene are introduced into a kneader of the kind described in Example 1, and kneading is carried on, while cooling, until the desired degree of fineness of the pigment is attained. The mass is then introduced into a vacuum cabinet and the toluene is distilled off at 85° C. The dry product is ground as finely as possible in a hammer mill and stirred for 20 hours with 2000 parts of water to which have been added to improve the wetting of the dyestuff preparation 3 parts of the sodium salt, which is usually referred to as sodium dinaphthyl-methane disulfonate, of a condensation product of formaldehyde with a naphthalene sulfonation mixture containing predominantly naphthalene-2-sulfonic acid. The mixture is filtered with suction, the sodium carbonate is completely washed out with water, and the residue is dried in a vacuum cabinet at 85° C. The resulting product is a soft powder which can easily be worked up by trituration with toluene into a homogeneous paste.

Example 5

A mixture of 50 parts of the dyestuff from diazotized 2:5 - dichloro - 1 - aminobenzene and 1 - (2' - hydroxy-3' - naphthoyl) - amino - 2:5 - dimethoxybenzene, 50 parts of ethyl-cellulose, 50 parts of sodium chloride and 90 parts of toluene is kneaded, while cooling, in a kneading apparatus as described in Example 1 until the desired degree of fineness is attained. The sodium chloride is then washed out with water, the mass is dried in a vacuum cabinet at 85° C., and the product is ground in a hammer mill.

Example 6

A mixture of 60 parts of the dyestuff from diazotized 2:5 - dichloro - 1 - aminobenzene and 1 - (2' - hydroxy-3'-naphthoyl)-amino-2:5-dimethoxybenzene, 120 parts of chlorinated rubber, 120 parts of sodium chloride and 100 parts of toluene is treated, while cooling, in the kneading apparatus described in Example 1 until the desired degree of fineness is attained. The sodium chloride is washed out by introducing water, the kneading apparatus is then heated in order to evaporate the water still present in the mass, and finally the latter is freed from residual toluene in a vacuum cabinet at 85° C. The product is likewise ground in a hammer mill.

By using, instead of the above pigment, the dyestuff "Cibanone Blue RS" Color Index 1922, No. 1106), and otherwise proceeding in the manner described above, an analogous product is obtained.

Example 7

20 parts of copper phthalocyanine (reprecipitated from sulfuric acid in the usual manner), 40 parts of acetyl-cellulose (containing 54.5 per cent. of combined acetic acid), 40 parts of sodium chloride and 80 parts of methyl-glycol are introduced into the kneading apparatus described in Example 1. The mixture is kneaded, while cooling, until the desired degree of fineness is attained. The mass is then placed in a vacuum cabinet, the methyl glycol is distilled off at 85° C., and the product is ground as finely as possible in a hammer mill. The powder so obtained is stirred for 20 hours with 1000 parts of cold water to which has been added in order to improve the wetting of the dyestuff preparation 2 grams of sodium dinaphthyl-methane disulfonate (see Example 4). The mixture is then filtered with suction, the sodium chloride is completely washed out with water, and the residue is dried in a vacuum cabinet at 85° C. The finished product is a fine grained powder which needs no further grinding.

Example 8

A mixture of 32 parts of the dyestuff from diazotized 2 - methyl - 4 - chloro - 1 - aminobenzene and 1 - (2'-hydroxy - 3' - naphthoyl) - amino - 2 - methyl - 4 - chlorobenzene, 32 parts of acetyl-cellulose (containing 54.5 per cent. of combined acetic acid), 32 parts of ammonium chloride and 80 parts of methyl-glycol is treated, while cooling, in a kneading apparatus, as described in Example 1 until the desired degree of fineness of the pigment is attained. 100 parts of water are then added, and kneading is continued until a fine grained magma is obtained. The latter is placed on a suction filter and the ammonium chloride is completely washed out with water. The residue is dried in a vacuum cabinet at 85° C. and ground in a hammer mill.

Example 9

A mixture of 30 parts of gas black, 30 parts of acetyl-cellulose (containing 54.5 per cent of combined acetic acid), 30 parts of urea and 80 parts of acetone is treated in a kneading apparatus, as described in Example 1, while cooling, until the desired degree of fineness of the pigment is attained. There are then added 200 parts of ethyl alcohol, and kneading is carried on until a fine grained magma is obtained. The latter is placed on a suction filter and the urea is completely washed out with ethyl alcohol. The residue is dried in a vacuum cabinet at 85° C. and ground in a hammer mill.

Example 10

A solution is prepared from 150 parts of an ordinary commercial polyamide and 250 parts of concentrated formic acid.

A mixture of 200 parts of the above solution, 37.5 parts of chlorinated copper phthalocyanine (Schultz, Farbstoff-tabellen, 7th ed., supplementary vol. II, page 195) and 150 parts of sodium chloride is treated in a kneading apparatus as described in Example 1, while cooling, until the desired degree of fineness of the pigment is attained. There are then added 200 parts of water, and kneading is carried on until a fine grained paste is obtained. The latter is placed on a suction filter and the sodium chloride is completely washed out with water. After drying the residue in a vacuum cabinet at 85° C., the product is ground in a hammer mill.

Example 11

A solution is prepared from 50 parts of an ordinary commercial polyacrylonitrile and 150 parts of dimethyl-formamide.

130 parts of the above solution, 16.25 parts of Cibanone Blue RS (Color Index 1922, No. 1106) and 32.5 parts of sodium chloride are introduced into a kneading apparatus as described in Example 1. In order to form a kneadable mass immediately the apparatus is heated with steam for a short time, and then kneading is carried on, while cooling, until the desired degree of fineness of the pigment is attained. There are then added 100 parts of water, and kneading is continued until a pasty mass is obtained. The latter is placed on a suction filter and the sodium chloride together with the dimethyl-formamide is washed out completely with water. The residue is dried in a vacuum cabinet at 85° C. and the product is ground in a hammer mill.

Example 12

A mixture of 45 parts of "Staybelite Ester No. 10," 45 parts of sodium chloride, 15 parts of diacetone alcohol and 22.5 parts of the dyestuff from chlorinated copper phthalocyanine (Schultz, Farbstofftabellen, 7th ed., supplementary vol. II, page 195) is kneaded, while cooling, in a kneading apparatus as described in Example 1 capable of being heated. In order to form a kneadable mass rapidly, the mixture is heated with steam for a short time, then cooled, and the mass is kneaded until the desired degree of fineness of the pigment is attained. The kneading apparatus is then heated, the diacetone alcohol and the sodium chloride are completely washed out by introducing hot water, and finally the kneaded mass is freed from washing water still present by treatment in the kneader which is heated with steam. The resulting melt is discharged and, after cooling, is ground in a roller mill. If the kneading apparatus is of sufficiently strong construction, the melt may be allowed to cool therein, and may be subsequently disintegrated therein by continuing the operation of the kneader, use being made of the highly brittle character of the preparation. There is obtained a grainy to pulverulent mass which can easily be poured out.

By using a kneading mechanism of especially strong construction, for example, a dispersion kneader of the firm Werner and Pfleiderer, the quantity of the diacetone alcohol can be substantially reduced, for example, to about 0.75 part, the procedure being otherwise the same as described above, it being of advantage to use finely ground sodium chloride.

Example 13

A melt consisting of 40 parts of colophony, 20 parts of the dyestuff from diazotized 2-methyl-4-chloro-1-aminobenzene and 1-(2'-hydroxy-3'-naphthoyl)-amino-2-methyl-4-chlorobenzene and 30 parts of sodium chloride is kneaded at 120° C. in a kneader working on the Werner-Pfleiderer system and capable of being heated, until the desired degree of fineness of the pigment is attained. The product is then discharged from the kneading apparatus, and ground as finely as possible, and the powder is stirred for 10 hours with 300 parts of cold water to which has been added 1 part of sodium dinaphthyl-methane disulfonate (see Example 4) in order to improve the wetting of the dyestuff preparation. The mixture is then filtered with suction, the sodium chloride is completely washed out with water, and the residue is dried in a vacuum cabinet at 85° C. and ground in a hammer mill.

Example 14

A mixture of 13 parts of polyvinyl chloride, 7 parts of dioctyl phthalate and 0.08 part of the dyestuff preparation obtained as described in the first paragraph of Example 3 is placed in a 2-roller mechanism heated at 135° C. The rollers distribute the dyestuff preparation very rapidly, and there is obtained a transparent foil having a strong pink color.

Example 15

The pigment preparations described in Examples 1–13 can be used for coloring various lacquers, for example, as follows:

15 parts of the pigment preparation obtained as described in the first paragraph of Example 1 are pasted in a ball mill with 100 parts of an alkyd resin lacquer for one hour. Then a further 900 parts of the alkyd resin lacquer are added, and grinding is continued for one hour. After filtering the lacquer, it yields on tin plate, for example, when sprayed thereon and subsequently baked at 120° C., a pure blue transparent coloration.

1 part of the pigment preparation obtained as described in Example 5 is triturated in a grinding bowl with butyl acetate to form a homogeneous paste. There are then added in portions, while further grinding, 50 parts of a nitro cellulose lacquer. When coated on aluminium foils the resulting lacquer yields a strong brown transparent coloration.

Example 16

The pigment preparations described in Examples 7, 8 and 9 may be used for coloring cellulose acetate silk in the mass in the following manner.

2 parts of the pigment preparation of Example 7, which contains 33.3 per cent of copper phthalocyanine, are added to a cellulose acetate silk spinning solution consisting of 100 parts of acetyl-cellulose and 376 parts of acetone. The mixture is stirred for 3 hours, which suffices in order to obtain complete dispersion of the dyestuff. Threads produced from the resulting mass by dry spinning in the usual manner have a brilliant pure blue coloration and possess very good properties of wet fastness.

Example 17

2 parts of the pigment preparation obtained as described in Example 10 are added to 100 parts of a polyamide melt in a suitable apparatus at 230° C., and the mixture is stirred in an atmosphere of nitrogen for ½ hour, which suffices to obtain complete uniform dispersion of the dyestuff. Threads obtained from the resulting mass by spinning from the melt in the usual manner have a brilliant green coloration and possess very good properties of wet fastness.

Example 18

0.25 part of the pigment preparation obtained as described in Example 11 is strewed into a solution, heated at 110° C., of 5 parts of polyacrylonitrile in 22 parts of dimethyl-formamide, and the whole is stirred at that temperature for one hour, which suffices for complete uniform dispersion of the dyestuff. A thin film obtained by coating a thin layer of the resulting mass on a glass plate has a transparent blue coloration.

What is claimed is:

1. A process for converting a pigment into a pigment preparation containing the pigment in a finer state of dispersion, which comprises subjecting the pigment to an intensive mechanical kneading treatment in an organic medium having a viscosity of at least 10 centipoises at 20° C., the said organic medium forming the continuous phase and being substantially composed of a solution of a solid organic substance in an organic solvent, in the presence in said organic medium of a water-soluble inorganic salt acting as grinding assistant, and subsequently washing out the said grinding assistant with water.

2. A process for converting a pigment into a pigment preparation containing the pigment in a finer state of dispersion, which comprises subjecting the pigment to an intensive mechanical kneading treatment in an organic medium having a viscosity of at least 10 centipoises at 20° C., the said organic medium forming the continuous phase and being substantially composed of a solution of a water-insoluble solid organic substance in an organic solvent, in the presence in said organic medium of a water-soluble inorganic salt acting as grinding assistant, and subsequently washing out the said grinding assistant with water.

3. A process for converting a pigment into a pigment preparation containing the pigment in a finer state of dispersion, which comprises subjecting the pigment to an intensive mechanical kneading treatment in an organic medium having a viscosity of at least 10 centipoises at 20° C., the said organic medium forming the continuous phase and being substantially composed of a solution of a water-insoluble solid organic substance in an organic solvent, which is immiscible with water, in the presence in said organic medium of a water-soluble inorganic salt acting as grinding assistant, and subsequently washing out the said grinding assistant with water and finally evaporating the organic solvent.

4. A process for converting a pigment into a pigment preparation containing the pigment in a finer state of dispersion, which comprises subjecting the pigment to an intensive mechanical kneading treatment in an organic medium having a viscosity of at least 10 centipoises at 20° C., the said organic medium forming the continuous phase and being substantially composed of a solution of a water-insoluble solid organic substance in an organic solvent, in the presence in said organic medium of a water-soluble inorganic salt acting as grinding assistant, then evaporating the organic solvent and washing out the said grinding assistant with water.

5. A process for converting a pigment into a pigment preparation containing the pigment in a finer state of dispersion, which comprises subjecting the pigment to an intensive mechanical kneading treatment in an organic medium having a viscosity of at least 10 centipoises at 20° C., the said organic medium forming the continuous phase and being substantially composed of a solution of a water-insoluble solid organic substance in an organic solvent, which is miscible with water, in the presence in said organic medium of a water-soluble inorganic salt acting as grinding assistant, and washing out the said grinding assistant with water and finally drying the product.

References Cited in the file of this patent

UNITED STATES PATENTS

| | | |
|---|---|---|
| 2,268,144 | Vesce | Dec. 30, 1941 |

FOREIGN PATENTS

| | | |
|---|---|---|
| 228,844 | Great Britain | June 8, 1925 |
| 365,526 | Great Britain | Jan. 15, 1932 |